(12) United States Patent
Moon

(10) Patent No.: US 6,864,635 B2
(45) Date of Patent: *Mar. 8, 2005

(54) BALLAST SOCKET FOR COMPACT FLUORESCENT LAMP

(76) Inventor: Dai Sung Moon, 105-61 Donga 1-chn, Sindorim-dong, Kuroku, Seoul (KR)

(*) Notice: Subject to any disclaimer, the term of this patent is extended or adjusted under 35 U.S.C. 154(b) by 52 days.

This patent is subject to a terminal disclaimer.

(21) Appl. No.: 10/133,414

(22) Filed: Apr. 29, 2002

(65) Prior Publication Data

US 2003/0011327 A1 Jan. 16, 2003

Related U.S. Application Data

(63) Continuation-in-part of application No. 09/948,554, filed on Sep. 10, 2001, now Pat. No. 6,545,417.

(30) Foreign Application Priority Data

| Jul. 12, 2001 | (KR) | 2001-21194 |
| Aug. 3, 2001 | (KR) | 2001-23593 |
| Dec. 29, 2001 | (KR) | 2001-40834 |

(51) Int. Cl.[7] ............................................ H01J 7/44
(52) U.S. Cl. ............................................ 315/56; 315/58
(58) Field of Search .................. 315/56, 58, 59, 315/60; 439/226, 236, 602

(56) References Cited

U.S. PATENT DOCUMENTS

| 4,674,015 A | 6/1987 | Smith |
| 4,947,297 A | 8/1990 | Druffel et al. |
| 5,465,196 A | 11/1995 | Hasenberg et al. |
| 5,471,375 A | 11/1995 | Lau |
| 5,477,439 A | 12/1995 | Kowalenko et al. |
| 5,479,075 A | 12/1995 | Chen |
| 5,569,981 A | * 10/1996 | Cho ............................. 315/56 |

* cited by examiner

Primary Examiner—David Vu
(74) Attorney, Agent, or Firm—Mayer, Brown, Rowe & Maw LLP

(57) ABSTRACT

A ballast socket for compact fluorescent lamp is disclosed. The ballast socket includes: a case having an upper case, which has a receiving space for receiving a lamp and a connection terminal connected with the lamp at a side of the receiving space, and a lower case, which has a through hole at a lower center of the upper case; a controller mounted inside the case for controlling lighting of the lamp; pins for connecting PCB and the connection terminal; and a printed circuit board on which various circuit components are mounted. The ballast socket looks similar to an incandescent lamp socket in outward form, but the compact fluorescent lamp, which does not have ballast, is used in the ballast socket. Therefore, the ballast socket prevents waste of resources and environmental pollution by saving electricity, and improves productivity of the lamp by manufacturing the lamp not adhering ballast thereon.

16 Claims, 6 Drawing Sheets

BALLAST SOCKET FOR COMPACT FLUORESCENT LAMP

This is a Continuation-in-part of U.S. Ser. No. 09/948,544 filed Sep. 10, 2001. Now U.S. Pat. No. 6,545,417.

BACKGROUND OF THE INVENTION

1. Field of the Invention

The present invention relates to a ballast socket for a compact fluorescent lamp, and more particularly, to a ballast socket for a compact fluorescent lamp being enabled to use a compact lamp, which does not have a ballast, regardless of a standard by mounting a printed circuit board (hereinafter, referred to as "PCB"), which has various components attached thereon, inside the socket.

2. Background of the Related Art

As you know, illuminating means, such as incandescent bulbs and lamps, which emits light and is adhered on the ceiling of an office, a house or a building, serves to light up the surroundings or to make dark according to a user's selection when the sun sets or the surroundings get dark and is replaced with a new one if the life of the illuminating means is up.

A fluorescent lamp is classified into a 20 W lamp and a 40 W lamp and includes a transformer and ballast.

A compact fluorescent lamp, which is conveniently used and bought, can be used in a socket for a general incandescent lamp thanks to having the ballast on the upper end of the lamp and a screw part.

Presently, a lamp socket for the incandescent lamp and the fluorescent lamp attaching the ballast therein has been widely used for an interior illumination of the house, the office and a company or for the interior illumination of a refrigerator or a microwave oven.

However, because the compact fluorescent lamp has four or two connection pins, the socket that fits for the connection pins must be used. Above all, such conventional lamp is very expensive because the ballast is directly adhered on every lamp, which causes waste of resources and environmental pollution because of being thrown away if the life of the ballast is up.

Moreover, a lamp not having the ballast requires the transformer or electronic ballast besides the socket and must be installed in inside of the illuminating means. However, it is difficult to install them in the illuminating means due to a bulky transformer or electronic ballast, which consequently lowers productivity.

SUMMARY OF THE INVENTION

Accordingly, the present invention is directed to a ballast socket for compact fluorescent lamp that substantially obviates one or more problems due to limitations and disadvantages of the related art.

An object of the present invention is to provide a ballast socket for compact fluorescent lamp capable of enhancing productivity by mounting and manufacturing a printed circuit board, which has various circuit components integrally attached thereon, inside a socket.

Another object of the present invention is to provide a ballast socket for compact fluorescent lamp capable of improving product compatibility by manufacturing the ballast socket of which shape and size are similar to those of a socket for existing incandescent lamp and by making the same possible to be easily installed in an outdoor lamp and an interior lamp including a ceiling lamp, a table lamp, etc.

Further another object of the present invention is to provide a ballast socket for compact fluorescent lamp capable of preventing waste of resources by saving electricity by using a fluorescent lamp consuming electricity correlatively less than an incandescent lamp.

Still another object of the present invention is to provide a ballast socket for compact fluorescent lamp capable of preventing the environmental pollution.

Yet another object of the present invention is to provide a ballast socket for compact fluorescent lamp capable of improving productivity of the lamp by manufacturing the lamp without adhering ballast thereon.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a ballast socket for compact fluorescent lamp includes: a case having an upper case, which has a receiving space for receiving a lamp and a connection terminal connected with the lamp at one side of the receiving space, and a lower case, which has a through hole at a lower center of the upper case; a controller mounted in inside of the case for controlling lighting of the lamp; a printed circuit board (hereinafter, referred to as "PCB") on which the controller and other components are mounted; and pins for connecting the PCB and the connection terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
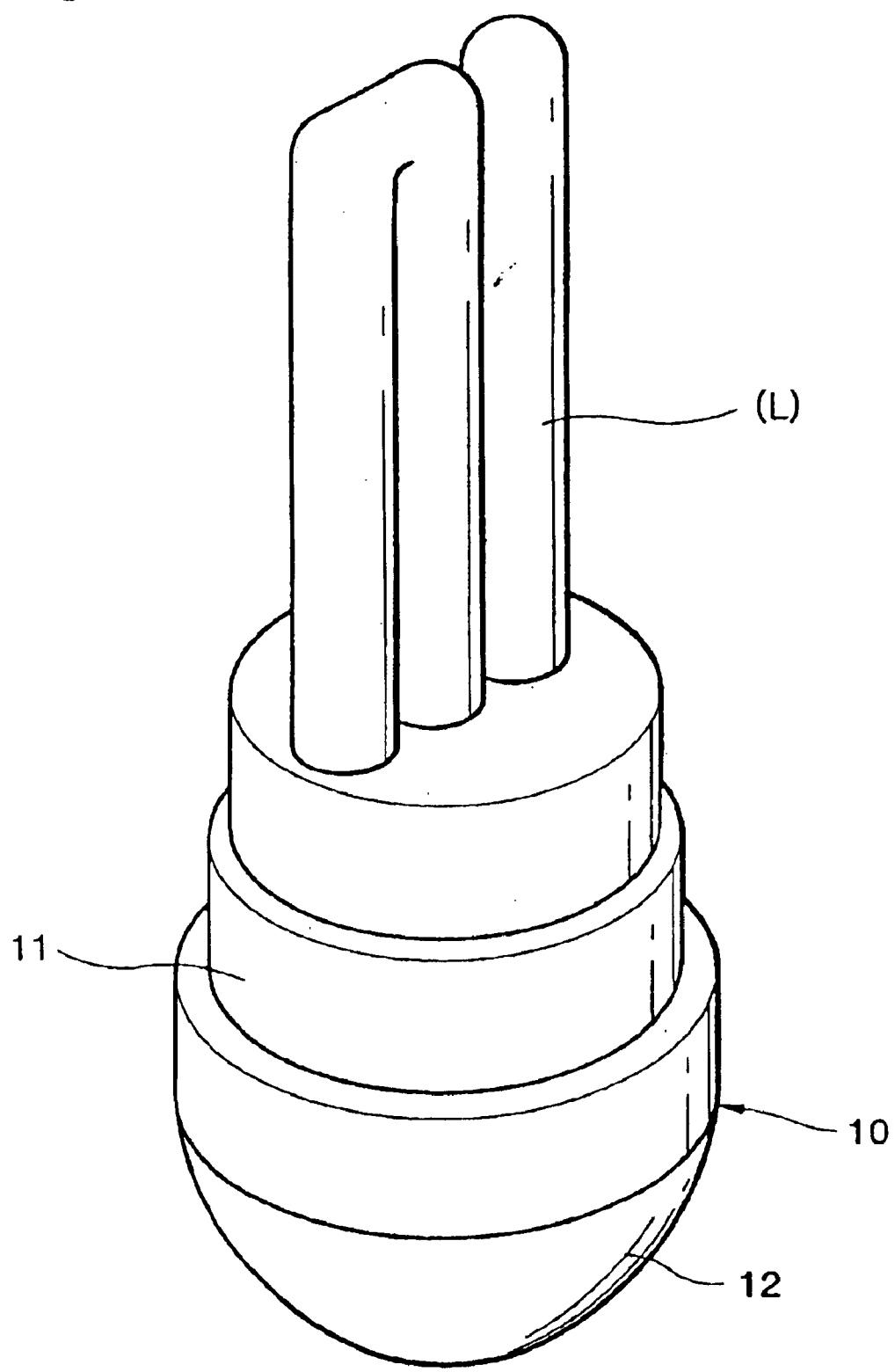
FIG. 1 illustrates a perspective view of a ballast socket applied to the present invention.
Figure 2:
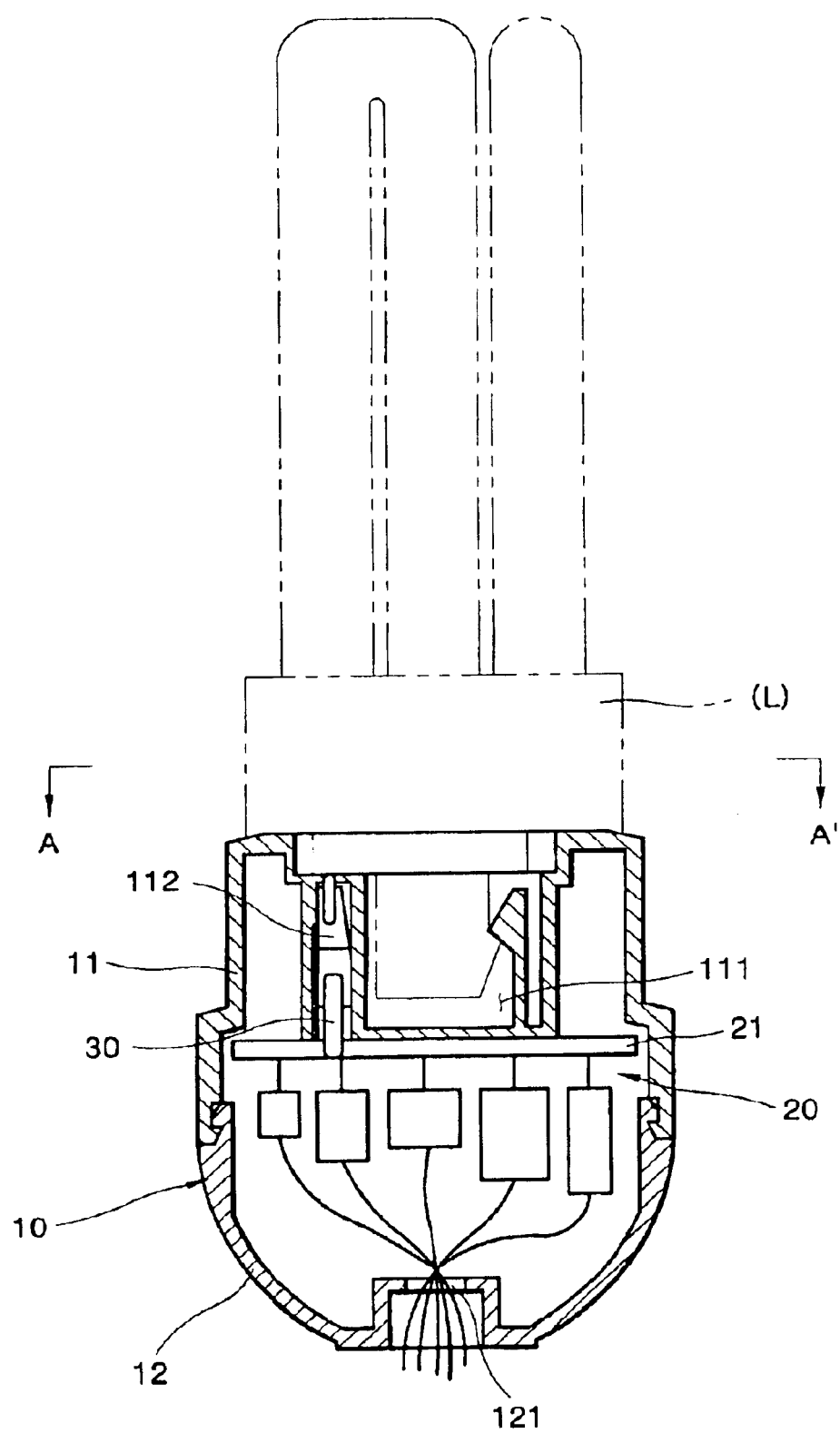
FIG. 2 illustrates a view of an inside structure of the ballast socket of FIG. 1.
Figure 3:
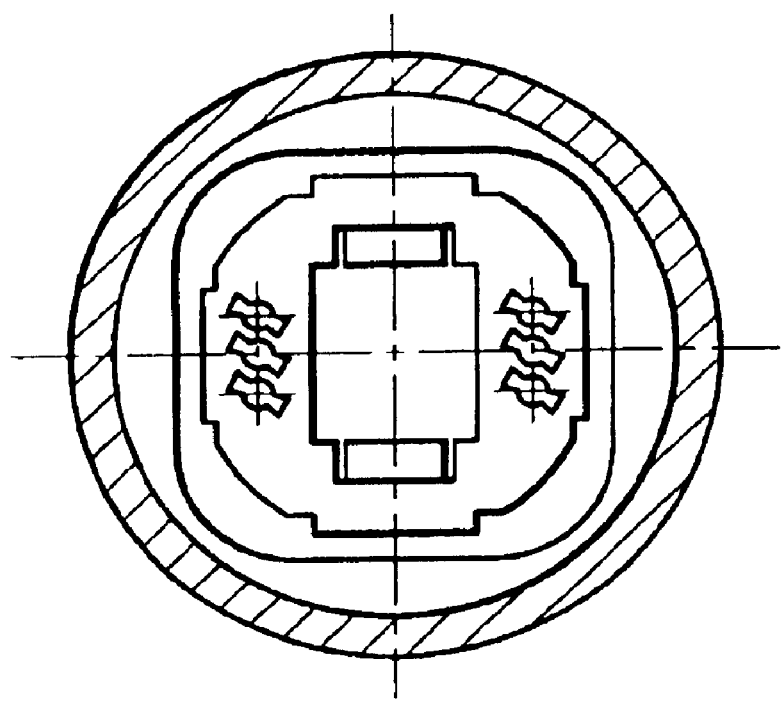
FIG. 3 illustrates a sectional view of the ballast socket along line A–A' of FIG. 2.
Figure 5:
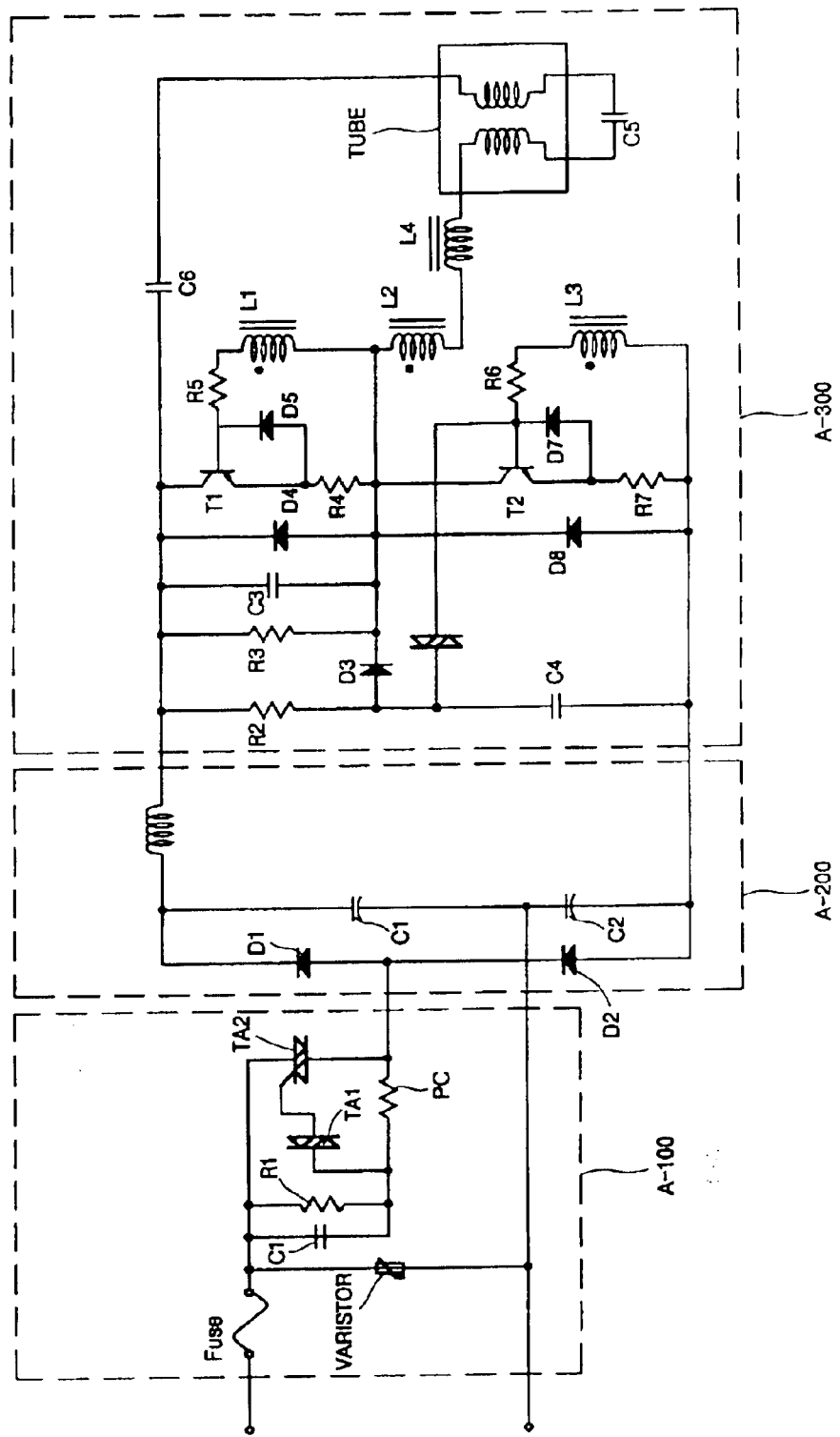
FIG. 5 illustrates a detailed circuit view of a ballast socket according to a first preferred embodiment of the present invention.
Figure 6:
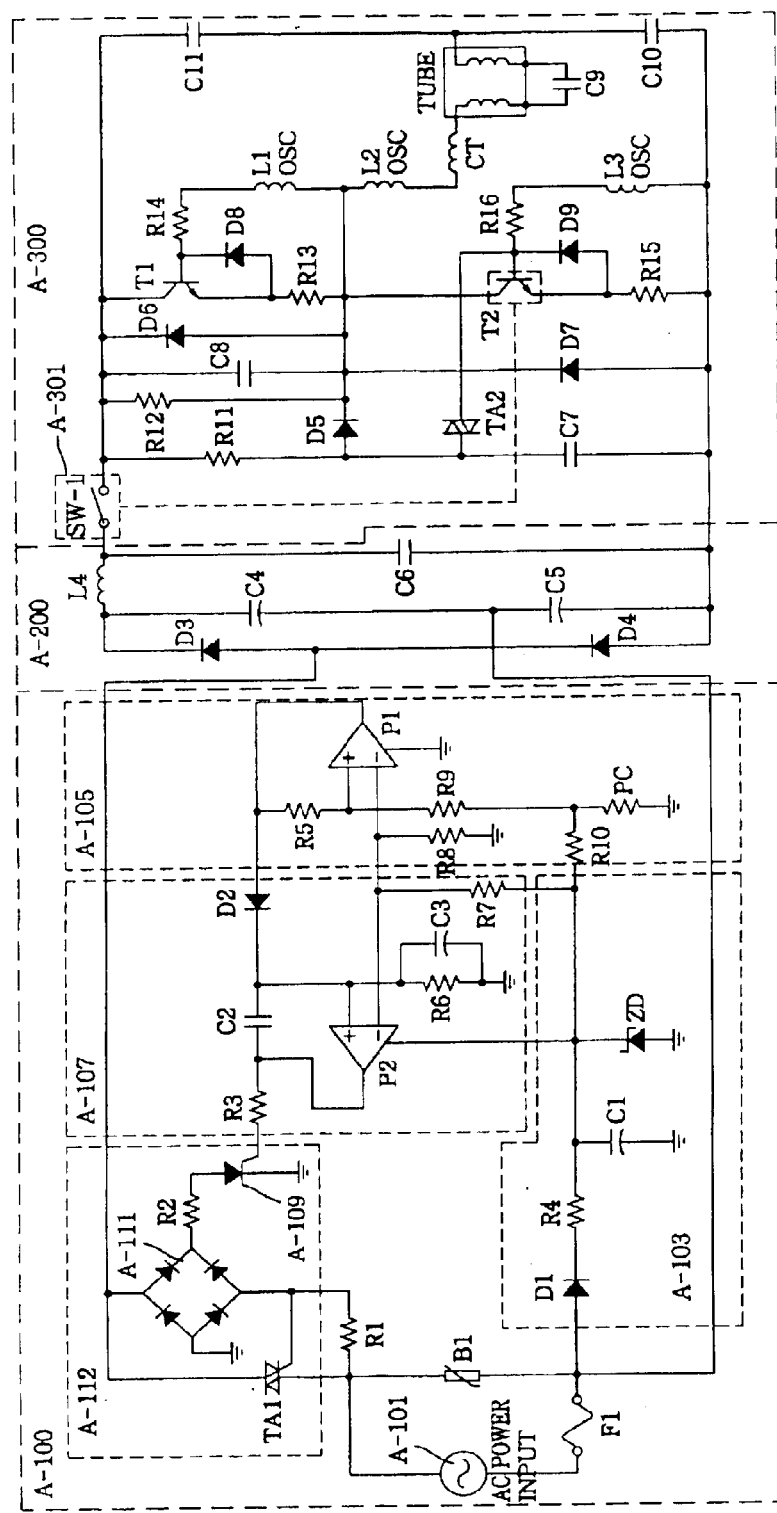
FIG. 6 illustrates a detailed circuit view of a ballast socket according to a second preferred embodiment of the present invention.

FIG. 1 illustrates a perspective view of a ballast socket applied to the present invention, FIG. 2 illustrates a view of an inside structure of the ballast socket. FIG. 3 illustrates the A–A' sectional view of FIG. 2, FIG. 4 illustrates a block diagram of the controller structure and FIGS. 5 and 6 illustrate detailed circuit views of a ballast socket according to first and second preferred embodiments of the present invention.

As shown in FIGS. 1 and 2, the socket according to the present invention includes a case 10 having an upper case 11, which has a receiving space 111 for receiving a lamp and a connection terminal 112 connected with the lamp at a side of the receiving space, and a lower case 12, which has a through hole 121 at a lower center of the upper case 11; a controller 20 mounted-in inside of the case 10 for controlling lighting of the lamp; a printed circuit board (PCB) 21 on which the controller 20 and other components are mounted; and pins 30 for connecting the PCB 21 and the connection terminal 112.

As shown in FIG. 3 the socket according to the present invention includes six pin holes so that the lamp is lit up if being fit for the socket without regard to a lamp having two inclined pins or having two straight pins or a four-pin lamp.

Figure 4:
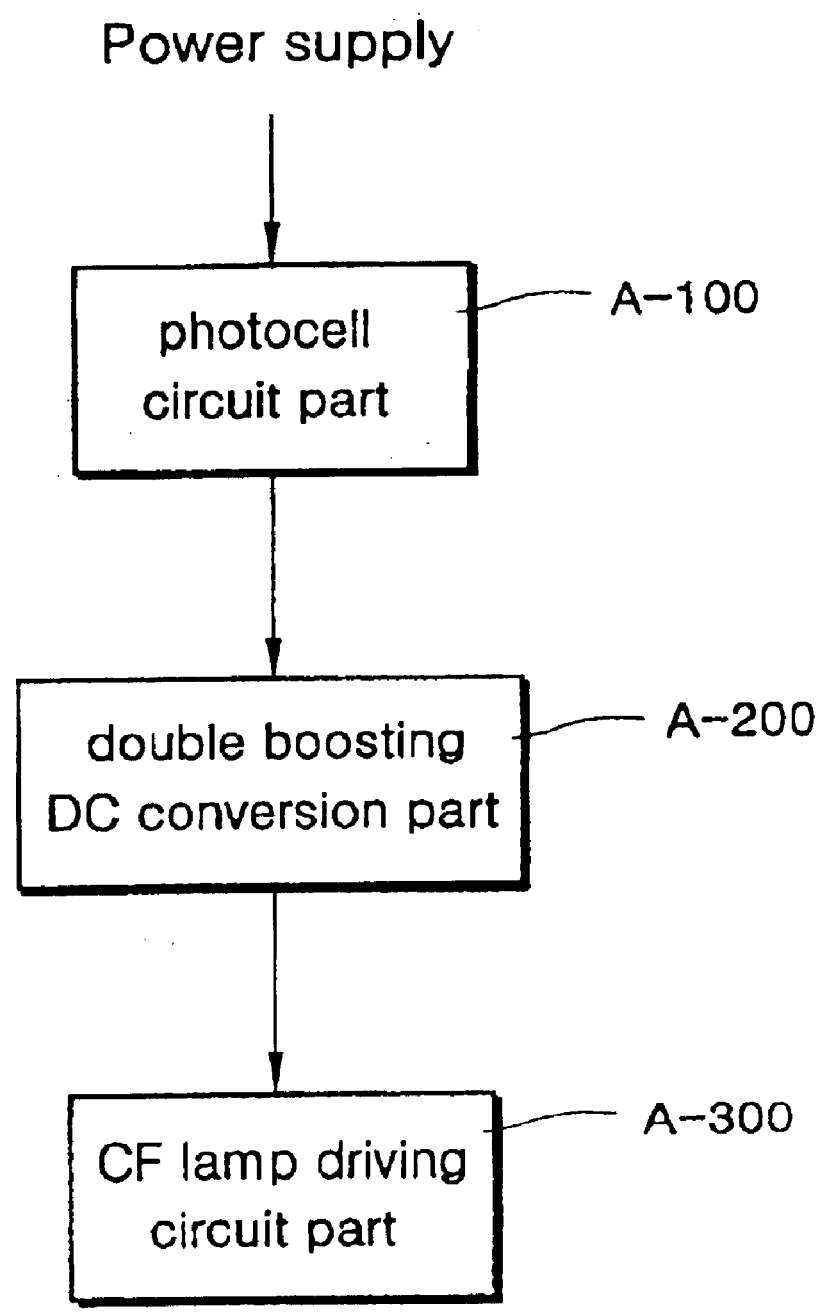
FIG. 4 is a block diagram showing a controller structure in accordance with the present invention.

FIG. 4 is a block diagram showing a structure of the controller 2O.

The reference numeral A-100 designates a photocell circuit part for supplying electric power (AC120V) to a double boosting DC conversion device part if it is dark around the photocell circuit part or for interrupting the electric power if it is light. The reference numeral A-200 designates the double boosting DC conversion device part that receives the electric power according to the control of the photocell circuit part A-100, converts the received electric power into double-boosted DC electric power and supplies CF lamp driving power to a CF lamp driving circuit part. The reference numeral A-300 designates the CF lamp driving circuit part that receives the CF lamp driving power output from the double boosting DC conversion device part A-200 and lights up a CF lamp (L).

FIG. 5 illustrates a detailed circuit view of a ballast socket according to a first preferred embodiment of the present invention.

As shown in FIG. 5, the photocell circuit part A-100 includes a photoelectric cell (PC) connected to the power source of the socket and having a resistance value that is gradually reduced when exposed in the light and gradually increased in the dark, first and second triacs (TA1 and TA2) connected to the photoelectric cell for supplying or interrupting the electric power to or from diodes (D1, D2) of the double boosting DC conversion device part A-200 according to an inner resistance value of the photoelectric cell, and a condenser (C1) connected to the photoelectric cell for storing voltage.

In addition, the double boosting DC conversion device part A-200 includes the diodes (D1, D2) rectifying AC electric power through a resistance (R1) and the condenser (C1) of the photocell circuit part A-100 and making them into double DC voltage, and electrolytic condensers (C1, C2) connected to the diodes (D1, D2), making the double DC voltage output from the diodes (D1, D2) smooth and outputting into the DC electric power.

Furthermore, the CF lamp driving circuit part A-300 includes power transistors (T1 and T2) and coils (L1, L2, L3 and L4) connected to the diodes (D1, D2) and the electrolytic condensers (C1, C2) of double boosting DC conversion device part A-200 and making oscillation voltage for lighting up the CF lamp (L), and a tube (TUBE) connected to the coils (L1, L2, L3 and L4) for being provided with high frequency voltage and lighting up the CF lamp (L).

Next, a coupling process of the present invention will be described as follows.

First, the connection terminal 112 is mounted at one side of the receiving space 111 of the upper case 11. The PCB 21 having the components of the controller 20 mounted thereon for lighting up the lamp (L) is closely adhered to the other side of the receiving space 111. After that, the pins 30 are inserted into the PCB 21 and connected and fixed to the connection terminal 112.

After that, electric wires for supplying the electric power are connected to each component of the controller 20. The connected electric wires are discharged to the outside through the through hole 121 of the lower case 12. The lower case 12 is pressurized and fixed from the bottom of the upper case 11 to install on a ceiling or a wall surface. At this time, the coupling is finished by inserting and coupling the lamp (L) into the receiving space 111 of the case 10.

The completed socket is similar in shape and size to a socket for incandescent lamp.

An operation process of the present invention will be described as follows.

First, the photocell circuit part A-100 receives common electric power (AC120V). The received common electric power determines whether or not the lamp is lit up through the photoelectric cell of the photoelectric circuit part. If the lamp is determined to be lit up, AC current is converted into double DC electric power by the diodes (D1, D2) and the electrolytic condensers (C1, C2) of the double boosting DC conversion device part A-200, and the power transistors (T1 and T2) of the CF lamp driving circuit part A-300 are repeatedly operated and thereby lighting up the lamp through the coils (L2 and L4).

That is, if it is light around the photocell circuit part A-100, electricity supplied to the double boosting DC conversion device part A-200 or the CF lamp driving circuit part A-300 is interrupted so as not to light up the lamp. If it is dark around the photocell circuit part A-100, the photoelectric cell turns on the triacs (TA1 and TA2), which are switching elements. Thus, the diodes (D1, D2) of the double boosting DC conversion device part A-200 and the triacs (TA1 and TA2) of the CF lamp driving circuit part A-300 are operated, and the coils (L1,L2, L3 and IA) are operated, thereby lighting up the lamp.

Here, the triacs (TA1 and TA2) are semiconductor switching elements for maintaining two on-off stable states in a PNPN structure over four layers.

When voltage is applied to a base of the power transistors (T1 and T2) of the CF lamp driving circuit part A-300, the power transistors (T1 and T2) are operated with crossing over with each other repeatedly. Such oscillation voltage provides high oscillation voltage to the CF lamp (L) through the coils (L1, L2, L3 and L4) again.

Here, an appropriate ratio between the power transistors (T1 and T2) and the coils (L1, L2, L3 and L4) is a numerical value for making the PL lamp in any type standards possible to be used.

Moreover, according to the present invention, the socket is the CF lamp socket, which is provided with voltage of high frequency from the CF lamp driving circuit part and lights up the CF lamp, and can be used in any lamp, e.g., two-pin or four-pin lamp.

FIG. 6 illustrates a detailed circuit view of a ballast socket according to a second preferred embodiment of the present invention.

The photocell circuit part A-100 includes a power supply part A-101 for supplying electric power, a first amplifying part A-105 which is an illumination sensing OP-AMP circuit for sensing illumination and generating output signal, a second amplifying part A-107 which is an output delay OP-AMP circuit for delaying output signal, and a switching circuit A-112 for receiving output signal of the second amplifying part and performing a switching function. The switch circuit A-112 includes a thyristor (SCR) A-109, a bridge diode A-111 and a triac TA1.

An operation of the photocell circuit will be described in more detail as follows.

When DC voltage is supplied to the power supply part A-101, AC power source is required to operate the circuit, and so, a DC conversion circuit A-103 is used for the input AC power source into a DC power source. In the DC conversion circuit, the AC power source input is converted into the DC power source through D1, R4 and C1. The DC power source with a prescribed voltage is provided to the circuit through a Zener diode (ZD), and the voltage is provided to an OP-AMP (P1) input of the first amplifying part A-105, which is the illumination sensing OP-AMP circuit, through a CDS changing a resistance value according to the surrounding brightness. At this time, if it is dark around the photocell circuit part A-100, the resistance value of the CDS is increased, so that voltage is applied to the OP-AMP (P1) input of the first amplifying part A-105 and voltage is generated to output. The output voltage is applied to an OP-AMP (P2) input of the second amplifying part A-107. After that, voltage is generated to an OP-AMP output of the second amplifying part A-107, which is the output delay OP-AMP circuit, and thereby, the thyristor A-109, bridge diode A-111 and triac TA1 of the switching circuit A-112 are switched. When the triac TA1 is switched, the power source connected to the triac TA1 is provided to the input power source of the CF lamp driving circuit part A-300

Especially, while the lamp is lit up because it is dark around the photocell circuit part A-100, C2 is connected from the output delay OP-AMP circuit A-107 to the OP-AMP (P2) output to prevent the lamp from being turned off due to light of a car or momentary light. At this time, the C2 serves to prevent the lamp, which is turned on, from being turned off due to the momentary light for a prescribed period of time. Therefore, it is prevented that the lamp is turned off or flickered due to the momentary light.

As shown in FIG.1 6, the photocell circuit part A-100 includes the power supply part A-101 for supplying electric power; the DC conversion part A-103 for receiving the electric power output from the power supply part A-101, making the received electric power smooth and outputting the electric power into the DC power source; the photoelectric cell connected to the DC conversion part A-103 and to the power source of the socket, the photoelectric cell being lowered in the resistance value when it is exposed to the light and increased in the resistance value in the dark; the first and second amplifying parts A-105 and A107 connected to the photoelectric cell, the amplifying parts A-105 and A107 outputting output voltage at high or low level after comparing the output voltage with reference voltage according to the inner resistance value of the photoelectric cell; the thyristor (SCR) A-109 connected to the first and second amplifying parts A-105 and A107 for switching voltage output from the first and second amplifying parts A-105 and A107; the bridge diode (BD) A-111 connected to the thyristor A-109 for rectifying voltage output from the thyristor A-109; the triac TA1 connected to the bridge diode A-111 for supplying the electric power to the double boosting DC conversion device part A-200 or interrupting the supply of the electric power to the same; and a varistor B1 connected between the triac TA1 and the double boosting DC conversion device part A-200 for protecting them with the voltage.

Here, the first amplifying part A-105 includes resistances (R5, R8 and R9) and a diode (D2), and the second amplifying part A107 includes the amplifier (P2), resistances (R3, R6 and R7), coils (C2) and (C3) and the Zener diode (ZD).

Moreover, the DC conversion part A-103 includes a diode (D1), a resistance (R4) and a condenser (C1).

The double boosting DC conversion device part A-200 includes diodes (D3 and D4) and electrolytic condensers (C5 and C6) for boosting voltage, which is rectified in the bridge diode A-111 of the photocell circuit part A-100, to double DC voltage.

Furthermore, the CF lamp driving circuit part A-300 includes: the power transistors (T1 and T2) connected to the diodes (D3 and D4) and the electrolytic condensers (C5 and C6) of the double boosting DC conversion device part A-200 and making oscillation voltage for lighting up the CF lamp (L); oscillation coils (L1, L2 and L3) connected to the power transistors (T1 and T2) for generating frequency of 25 KHz to 30 KHz according to a value of the coil; a tube (TUBE) connected to the oscillation coils (L1, L2 and L3) for receiving high frequency voltage to light up the CF lamp; a condenser (C11) connected between the oscillation coil (L3) and the tube, compensating surge voltage generated when the lamp is connected to the socket, thereby protecting the socket and the lamp; and a thermistor switch A-301 connected between the oscillation coil (L1) and the tube, sensing a temperature inside the socket, and then cutting off the power source of the lamp when the sensed temperature is higher than a reference temperature.

Additionally, the CF lamp driving circuit part A-300 further includes a plurality of diodes (D5, D6, D7, D8 and D9) for protecting the power transistors (T1 and T2), and a diac (DIAC-1) for preventing over-current applied to the base of the power transistor (T2).

An operation process of a second embodiment of the present invention will be described as follows.

First, the photocell circuit part A-100 receives the common electric power (AC120V). The received common electric power determines whether or not the lamp is lit up through the photoelectric cell of the photoelectric circuit part. If the lamp is determined to be lit up, the common electric power is converted into the double DC electric power by the diodes (D3, D4) and the electrolytic condensers (C4, C5, C6) of the double boosting DC conversion device part A-200 and the power transistors (T1 and T2) of the CF lamp driving circuit part A-300 are repeatedly operated, and thereby the lamp is lit up through the oscillation coils (L1, L2 and L3).

That is, if it is light around the photocell circuit part A-100, the electricity supplied to the double boosting DC conversion device part A-200 or the CF lamp driving circuit part A-300 is interrupted not to light up, and the lamp is turned off, but is not turned off by the momentary light. If it is dark around the photocell circuit part A-100, the photoelectric cell turns on the triac (TA1), which is the switching element.

Here, the photoelectric cell is increased in the inner resistance value if it is darker in the surroundings of the photoelectric cell than luminosity of 10 LUX~30 LUX. The photoelectric cell inputs the voltage, which is higher than the reference voltage, to the first and second amplifiers (P1 and P2) of the first and second amplifying parts A-105 and A-107, which are the OP-AMP circuits.

At this time, the first and second amplifiers (P1 and p2), which are the OP-AMP circuits, generate output voltage and output the same to a gate of the thyristor (SCR) A-109. Especially, the C2 circuit of the second amplifier (P2) serves to prevent the lamp, which is turned on, from being turned off due to the momentary light around the lamp.

Furthermore, the thyristor A-109 switches voltage applied to the gate and outputs the switched voltage to a gate of the triac (TA1) through the bridge diode A-111.

The triac (TA1) switches voltage applied to the gate and outputs the switched voltage to the double boosting DC conversion device part A-200.

Especially, the DC conversion part A-103 of the photocell circuit part A-100 receives the electric power output from the power supply part A-101, smoothes the electric power to the DC electric power and outputs the same to the first and second amplifiers (P1 and P2) of the first and second amplifying parts A-105 and A-107 and other circuits.

Meanwhile, the DC voltage input to the double boosting DC conversion device part A-200 is double-boosted by the diodes (D3 and D4) and the electrolytic condensers (C4, C5 and C6).

And, the double boosting DC conversion device part A-200 outputs the double-boosted voltage to the power transistors (T1 and T2) through a resistance (R11), the diode (D5), the condenser (C7) and through the diac (DIAC-1) of the CF lamp driving circuit part A-300.

At this time, the power transistors (T1 and T2) are operated with crossing over mutually.

Especially, the power transistors (T1 and T2) are oscillated in the frequency of 25 KHz to 30 KHz according to the value of the oscillation coils (L1, L2 and L3) connected to the base. The oscillation voltage supplies instantaneously high voltage to both ends of the lamp while passing the CT coil and condenser (C10) of the tube (TUBE).

Therefore, the lamp is lit up while ionizing gas inside the lamp.

Furthermore, the condenser connected between the oscillation coil (L3) and the tube protects the socket and the lamp by compensating the surge voltage generated while connecting the lamp to the socket.

And, the thermistor switch A-301 connected between the oscillation coil (L1) and the tube senses the temperature inside the socket, and then cuts off the power source of the CF lamp driving circuit part A-300 to turn off the lamp, if the sensed temperature is higher than the reference temperature.

As described above, the present invention can improve productivity by mounting the PCB, on which various components are integrally attached, inside a socket. Further, the present invention can improve product compatibility by making various types of lamps, such as an outdoor lamp, an interior lamp, etc., possible to be easily installed on the socket for an incandescent lamp of which shape and size are similar to those of a ballast socket. Furthermore, the socket can prevent waste of resources by saving electricity by using a fluorescent lamp consuming electricity correlatively less than the incandescent lamp because being used without regard to the standard of the lamp and prevents the environmental pollution. Moreover, the present invention can improve productivity of the lamp by manufacturing the lamp without adhering ballast thereon.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A ballast socket for a compact fluorescent lamp, the ballast socket comprising:
   a case having an upper case, which has a receiving space for receiving a lamp and a connection terminal connected with the lamp at one side of the receiving space, and a lower case. which has a through hole at a lower center of the upper case;
   a controller mounted inside the case for controlling lighting of the lamp, said controller including,
      a photocell circuit part supplying AC electric to a double boosting DC conversion device part if it is dark around the photocell circuit part, the photocell circuit part interrupting the electric power if it is light around the photocell circuit part;
      the double boosting DC conversion device part receiving the electric power under control of the photocell circuit part, the double boosting DC conversion device part converting the received AC power into DC power and supplying CF lamp driving power to a CF lamp driving circuit part; and the CF lamp driving circuit part for receiving the CF lamp driving power output from the double boosting DC conversion device part to light up a CF lamp;

a printed circuit board on which the controller is mounted; and pins for connecting the printed circuit board and the connection terminal.

2. The ballast socket according to claim 1, wherein the photocell circuit part includes:

a photoelectric cell connected to a power source of the socket and having a resistance value gradually lowered when exposed in the light and gradually increased in the dark;

first and second triacs connected to the photoelectric cell for supplying or interrupting the electric power to or from diodes of the double boosting CD conversion device part according to an inner resistance value of the photoelectric cell; and a condenser connected to the photoelectric cell for storing voltage.

3. The ballast socket according to claim 1, wherein the double boosting DC conversion device part includes:

diodes rectifying the AC electric power through a resistance and a condenser of the photocell circuit part and making the rectified power source into double-boosted DC voltage; and electrolytic condensers connected to the diodes, the electrolytic condensers smoothing DC voltage output from the diodes and outputting DC electric power.

4. The ballast socket according to claim 3, wherein the CF lamp driving circuit part includes:

power transistors and coils connected to the diodes and the electrolytic condensers of the double boosting DC conversion device part, the power transistors and the coils making oscillation voltage for lighting up the CF lamp; and a tube connected to the coils for being provided with high frequency voltage and lighting up the CF lamp.

5. The ballast socket according to claim 4, wherein a value of the power transistors and a value of the coils are coupled in an appropriate ratio and used in correspondence with a volume of the CF lamp.

6. The ballast socket according to claim 1, further including six contact pin holes, so that the lamp is lit up if being fit for the socket without regard to a number of pins of said lamp.

7. A ballast socket for a compact fluorescent lamp, the ballast socket comprising an upper case with a receiving space for receiving a lamp and a connection terminal connected with the lamp at one side of the receiving space, a lower case having a through hole at a lower center of the upper case, and a controller mounted inside the upper and lower cases for controlling lighting of the lamp, said controller having a photocell circuit part which includes:

a power supply part for supplying electric power;

a DC conversion part for receiving the electric power output from the power supply part, smoothing the received electric power and outputting the electric power as DC electric power;

a photoelectric cell connected to the DC conversion part and to electric power of the socket, the photoelectric cell being lowered in a resistance value when it is exposed to a light place and increased in the resistance value at a dark place;

first and second amplifying parts connected to the photoelectric cell, the amplifying parts outputting an output voltage at a high or low level after comparing the output voltage with a reference voltage according to the resistance value of the photoelectric cell;

a thyristor connected to the first and second amplifying parts for switching the output voltage from the first and second amplifying parts;

a bridge diode connected to the thyristor for rectifying voltage output from the thyristor;

a triac connected to the bridge diode for supplying electric power to the DC conversion part or stopping the supply of electric power; and a varistor connected between the triac and the DC conversion part.

8. The ballast socket according to claim 1, wherein said double boosting DC conversion device part includes diodes and electrolytic condensers for boosting the voltage, which is rectified in a bridge diode of the photocell circuit part, to double DC voltage.

9. The ballast socket according to claim 3, wherein the CF lamp driving circuit part includes:

power transistors connected to the diodes and the electrolytic condensers of the double boosting DC conversion device part, the power transistors making oscillation voltage for lighting up the CF lamp;

oscillation coils connected to the power transistors for generating frequency of 25 KHz to 30 KHz according to a value of the coils;

a tube connected to the oscillation coils for receiving high frequency voltage to light up the CF lamp;

a condensor connected between the oscillation coil and the tube, compensating the surge voltage generated while connecting the lamp to the socket, thereby protecting the socket and the lamp;

a thermistor switch connected between the oscillation coil and the tube, sensing temperature inside the socket, and then turning off the light of the lamp if the sensed temperature is higher than a reference temperature; and a plurality of diodes for protecting the power transistors and a diac for preventing over-current applied to a base of the power transistor.

10. A ballast socket for a compact fluorescent lamp, the ballast socket comprising:

an upper case having a receiving space for receiving a lamp and a connection terminal connected with the lamp at one side of the receiving space;

a lower case having a through hole, said lower case adapted to connect to said upper case;

a controller mounted inside the upper and lower cases when said cases are connected together, said controller for controlling lighting of the lamp and including, a photocell circuit part supplying electric power to a DC conversion device if it is dark around the photocell circuit part, the photocell circuit part interrupting the electric power if it is light around the photocell circuit part;

the DC conversion device receiving the electric power under control of the photocell circuit part, the DC conversion device converting the received power into DC power and supplying CF lamp driving power to a CF lamp driving circuit part; and the CF lamp driving circuit part for receiving the CF lamp driving power output from the DC conversion device part to light up a CF lamp.

11. The ballast socket according to claim 10, wherein the photocell circuit part includes:

a photoelectric cell connected to a power source of the socket and having a resistance value gradually lowered when exposed in the light and gradually increased in the dark;

first and second triacs connected to the photoelectric cell for supplying or interrupting the electric power to or from diodes of the DC conversion device according to an inner resistance value of the photoelectric cell; and a condenser connected to the photoelectric cell for storing voltage.

12. The ballast socket according to claim 10, wherein the DC conversion device includes:

diodes rectifying electric power through a resistance and a condenser of the photocell circuit part to generate a DC voltage; and electrolytic condensers connected to the diodes, the electrolytic condensers smoothing DC voltage output from the diodes and outputting DC electric power.

13. The ballast socket according to claim 12, wherein the CF lamp driving circuit part includes:

power transistors and coils connected to the diodes and the electrolytic condensers of the DC conversion device, the power transistors and the coils making oscillation voltage for lighting up the CF lamp; and a tube connected to the coils for being provided with high frequency voltage and lighting up the CF lamp.

14. The ballast socket according to claim 13, wherein a value of the power transistors and a value of the coils are coupled in an appropriate ratio and used in correspondence with a volume of the CF lamp.

15. The ballast socket according to claim 10, wherein said DC conversion device includes diodes and electrolytic condensers for boosting the voltage, which is rectified in a bridge diode of the photocell circuit part, to double DC voltage.

16. The ballast socket according to claim 11, wherein the CF lamp driving circuit part includes:

power transistors connected to a diode and an electrolytic condenser of the DC conversion device, the power transistors making oscillation voltage for lighting up the CF lamp;

oscillation coils connected to the power transistors for generating a frequency of 25 KHz to 30 KHz according to a value of the coils;

a tube connected to the oscillation coils for receiving high frequency voltage to light up the CF lamp;

a condensor connected between the oscillation coil and the tube, compensating the surge voltage generated while connecting the lamp to the socket, thereby protecting the socket and the lamp;

a thermistor switch connected between the oscillation coil and the tube, sensing temperature inside the socket, and turning off the light of the lamp if the sensed temperature is higher than a reference temperature; and a plurality of diodes for protecting the power transistors and a diac for preventing over-current applied to a base of the power transistor.

* * * * *